Patented Aug. 18, 1931

1,819,792

UNITED STATES PATENT OFFICE

CHARLES J. ROMIEUX, OF ELIZABETH, AND LUDWIG J. CHRISTMANN, OF JERSEY CITY, NEW JERSEY, ASSIGNORS TO AMERICAN CYANAMID COMPANY, OF NEW YORK, N. Y., A CORPORATION OF MAINE

RUBBER ACCELERATOR AND METHOD OF USING THE SAME

No Drawing.   Application filed December 20, 1927.   Serial No. 241,446.

This invention relates to rubber accelerators, more particularly to substances of organic nature and containing phosphorus as an essential element. This application is a continuation in part of our co-pending application, Serial #206,937, filed July 19, 1927, entitled "Rubber accelerator and method of using the same".

In the aforesaid application we have described a series of compounds and a method of using the same, which compounds are formed by causing a reaction to take place between organic oxygen containing substances, such as phenols and alkyl alcohols with phosphorous pentasulphide, or the equivalent thereof, such as phosphorus and sulphur or a sulphide of phosphorus which is capable of reacting with said compounds to form thiophosphates. Specifically the compounds which we claim therein are di-alkyl or di-aryl di-thio phosphoric acids.

According to the present invention we utilize the di-thio acids which in themselves are excellent accelerators, and cause the same to combine with basic compounds or radicles either of the metallic or non-metallic type. We prefer to use non-metallic basic materials and more particularly we utilize amines of various types. The combinations are in all cases excellent accelerators having properties rendering them more useful than the original di-thio acids. By the combination with the basic compound the acidity of the said acids is neutralized, thus rendering the compounds much more simple to handle and there is no danger of corrosion taking place because of contact of acid materials with metals and other substances subject to deterioration by acid. The new compounds are also much easier for the workmen to handle and in practically all cases the neutralized materials have a greater accelerating value than the original di-thio acids. Some of the di-thio acids are not suitable as accelerators due to a lack of stability and offensive odor, whereas the salts are stable and odorless.

The method used in producing compounds of this type is very simple and it may consist merely in placing the di-substituted di-thio phosphate in a suitable vessel and adding thereto, in the presence of a suitable solvent, a compound such as a soluble salt of a metal, a metal, ammonia or an amine, and keeping the reaction vessel cool to avoid losses.

As an example of the operation of our invention we mixed 810 parts of di-amyl dithiophosphate with 633 parts of di-phenylguanidine. The di-phenylguanidine went into solution with the evolution of heat, which was probably due to the neutralization of the acidity of the di-thio acid, and the mixture was, therefore, kept cool to avoid loss. Upon being tested as a rubber accelerator it gave remarkable results as specifically set forth below. The compound most probably has the following structural formula:

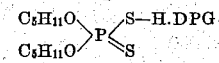

A procedure which has been found very effective is described in the co-pending application of Romieux and Wohnsiedler, Serial #223,056, filed November 15, 1927, for "Method of making di-thiophosphates" wherein there is specifically described the manufacture of a di-thiophosphate neutralized with an amine such as aniline, and the process described is applicable to other di-thiophosphates and other neutralizing substances.

We have produced a large number of compounds of this type and have tested the same in the vulcanization of rubber both at 258° F. and 288° F. In making these tests we used the following formula:

| | Parts by weight |
|---|---|
| Pale crepe | 100 |
| Zinc oxide | 5 |
| Sulphur | 5 |
| Accelerator | 1 |

| Alcohol from which dithiophosphoric acid was prepared | Metal or amine salt used | S—S data | | | | | |
|---|---|---|---|---|---|---|---|
| | | 30 min./258° F. cure | | | 30 min./288° F. cure | | |
| | | Modulus at 600% in lbs. sq. in. | At break | | Modulus at 600% in lbs. sq. in. | At break | |
| | | | Tension lbs. sq. in. | Elongation per cent | | Tension lbs. sq. in. | Elongation per cent |
| Ethyl | Ammonia | 925 | 3400 | 800 | 1050 | 3255 | 700 |
| | Aniline | 815 | 3720 | 840 | 990 | 3190 | 780 |
| | o-toluidine | 535 | 2980 | 885 | 915 | 3330 | 800 |
| | Zinc | 640 | 3050 | 850 | 915 | 2885 | 770 |
| Isopropyl | Ammonia | 1750 | 3960 | 730 | 1425 | 2780 | 705 |
| | Aniline | 1545 | 3955 | 740 | 1270 | 3075 | 730 |
| | o-toluidine | 745 | 3340 | 830 | 1210 | 3140 | 745 |
| | Zinc | 730 | 3195 | 825 | 980 | 3130 | 780 |
| Sec. butyl | Ammonia | 1845 | 3575 | 710 | 1235 | 2455 | 710 |
| | Aniline | 1100 | 3475 | 765 | 1220 | 3125 | 775 |
| | o-toluidine | 795 | 3445 | 820 | 1020 | 3075 | 775 |
| Amyl | Lead | | | | 860 | 3380 | 815 |
| | DPG | 810 | 4165 | 855 | | | |
| Phenol | Ammonia | | | | 275 | 1850 | 920 |
| | Aniline | | | | 280 | 1950 | 950 |
| | o-toluidine | | | | 175 | 1400 | 980 |
| | Zinc | | | | 160 | 600 | 895 |

It will be noted that we have made and tested the ammonia, aniline, ortho-toluidine and zinc salts of di-ethyl di-thio phosphoric acid, di-iso-propyl di-thiophosphoric acid, di-phenyl di-thiophosphoric acid and di-sec-butyl di-thiophosphoric acid, all of the same showing excellent results in a standard rubber mix.

We have also prepared and tested quite a number of other compounds of the same type and have found these also to be excellent accelerators. For example, we have prepared di-thiophosphoric acids from methyl, ethyl, iso-propyl, n-butyl, sec-butyl, amyl and like alcohols, phenol, ortho cresol and mixtures of phenols. These acids have been combined with ammonia, aniline, ortho-toluidine, zinc acetate, lead acetate, di-butyl amine, phenyl benzamidine, ortho-toluidine benzamidine, di-phenylguanidine, di-orthotolylguanidine, and methylamine.

It is apparent that our reaction is not confined to the substances which we have made and tested, but the same is applicable to a much larger variety of substances of similar character as is readily apparent from the above description. Our compounds are believed to have the following structural formula:

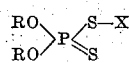

in which "R" is an organic radicle of the aromatic or aliphatic type, and "X" is a basic radicle which may be a metallic or non-metallic group including primary or secondary amines and ammonia as stated above. By the term amine, we intend to include such compounds as the substituted guanidines, the benzamidines, ammonia and substituted ammonias.

What we claim is:

1. A method which comprises adding to a rubber mix prior to vulcanization, the reaction product of an organic dithiophosphate and a basic compound, and then vulcanizing the mixture.

2. A method which comprises adding to a rubber mix prior to vulcanization, the reaction product of an organic dithiophosphate and a basic nitrogen compound, and then vulcanizing the mixture.

3. A method which comprises adding to a rubber mix prior to vulcanization, the reaction product of an alcohol with phosphorous pentasulphide and a guanidine, and then vulcanizing the mixture.

4. A method which comprises adding to a rubber mix prior to vulcanization, the reaction product of an alcohol with phosphorous pentasulphide and a substituted guanidine, and then vulcanizing the mixture.

5. A method which comprises adding to a rubber mix prior to vulcanization, the reaction product of amyl alcohol with phosphorous pentasulphide and di-phenylguanidine, and then vulcanizing the mixture.

6. A rubber accelerator having most probably the following structural formula:

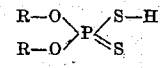

where "R" is an aliphatic or aromatic radicle, combined with a basic compound.

7. A rubber accelerator having most probably the following structural formula:

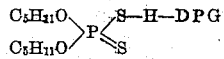

where DPG is di-phenylguanidine.

8. A rubber accelerator comprising the reaction product of an alcohol with phosphorous pentasulphide and a guanidine.

9. A rubber accelerator comprising the reaction product of an alcohol with phosphorous pentasulphide and a di-substituted guanidine.

10. A rubber accelerator comprising the reaction product of an alcohol with phosphorous pentasulphide and di-phenylguanidine.

11. A rubber accelerator comprising the reaction product of an organic dithiophosphate and a basic organic compound which is itself an accelerator.

12. A rubber accelerator comprising the reaction product of an organic di-thiophosphate and a basic nitrogen compound.

13. A rubber accelerator comprising the reaction product of an organic di-thiophosphate and an amine.

14. A rubber accelerator comprising the aniline salt of di-isopropyl di-thiophosphoric acid.

In testimony whereof, we have hereunto subscribed our names this 16th day of Dec., 1927.

CHARLES J. ROMIEUX.
LUDWIG J. CHRISTMANN.